United States Patent
Bartmuss

(10) Patent No.: US 12,138,712 B2
(45) Date of Patent: Nov. 12, 2024

(54) METHOD AND DEVICE FOR CHECKING A FOCUS POSITION OF A LASER BEAM IN RELATION TO A WORKPIECE

(71) Applicant: TRUMPF Laser GmbH, Schramberg (DE)

(72) Inventor: Ralf Bartmuss, Dietingen (DE)

(73) Assignee: TRUMPF LASER GMBH, Schramberg (DE)

( * ) Notice: Subject to any disclaimer, the term of this patent is extended or adjusted under 35 U.S.C. 154(b) by 728 days.

(21) Appl. No.: 17/142,257

(22) Filed: Jan. 6, 2021

(65) Prior Publication Data

US 2021/0121989 A1 Apr. 29, 2021

Related U.S. Application Data

(63) Continuation of application No. PCT/EP2019/068003, filed on Jul. 4, 2019.

(30) Foreign Application Priority Data

Jul. 6, 2018 (DE) .................... 10 2018 211 166.9

(51) Int. Cl.
*B23K 26/70* (2014.01)
*B23K 26/06* (2014.01)
*B23K 26/0622* (2014.01)
*B23K 26/082* (2014.01)
*B23K 26/21* (2014.01)

(52) U.S. Cl.
CPC ........ *B23K 26/705* (2015.10); *B23K 26/0622* (2015.10); *B23K 26/0643* (2013.01); *B23K 26/0648* (2013.01); *B23K 26/21* (2015.10); *B23K 26/082* (2015.10)

(58) Field of Classification Search
CPC .. B23K 26/705; B23K 26/0622; B23K 26/21; B23K 26/0643; B23K 26/0648; B23K 26/082; B23K 26/046; B23K 26/04
See application file for complete search history.

(56) References Cited

U.S. PATENT DOCUMENTS 9,776,280 B2 10/2017 Ogura et al.
10,814,422 B2 * 10/2020 Hagenlocher ........ B23K 26/048
(Continued)

FOREIGN PATENT DOCUMENTS

DE         10248458 A1    5/2004
DE   102014000330 B3 *    3/2015  .......... B23K 26/032
(Continued)

*Primary Examiner* — Janie M Loeppke
*Assistant Examiner* — Theodore J Evangelista
(74) *Attorney, Agent, or Firm* — LEYDIG, VOIT & MAYER, LTD.

(57) ABSTRACT

A method checks a focus position of a laser beam in relation to a workpiece. The method includes: focusing the laser beam at a plurality of positions along a trajectory on the workpiece; detecting radiation generated during an interaction of the laser beam with the workpiece at a respective position of the positions; determining signal values corresponding to the detected radiation at the respective position; and checking the focus position at at least one of the positions by comparing the respective one of the signal values at the respective position with a reference value formed from the signal values.

14 Claims, 2 Drawing Sheets

(56) References Cited

U.S. PATENT DOCUMENTS

| | | | | |
|---|---|---|---|---|
| 2006/0102600 A1* | 5/2006 | Schafer | ................ | B23K 26/123 |
| | | | | 219/121.84 |
| 2012/0188365 A1* | 7/2012 | Stork | ................... | B23K 26/046 |
| | | | | 348/90 |
| 2015/0083697 A1* | 3/2015 | Roos | .................... | B23K 26/032 |
| | | | | 219/121.61 |
| 2019/0126391 A1 | 5/2019 | Ganser et al. | | |

FOREIGN PATENT DOCUMENTS

| | | |
|---|---|---|
| DE | 102016204071 A1 | 9/2017 |
| JP | H11129084 A | 5/1999 |

* cited by examiner

METHOD AND DEVICE FOR CHECKING A FOCUS POSITION OF A LASER BEAM IN RELATION TO A WORKPIECE

CROSS-REFERENCE TO PRIOR APPLICATIONS

This application is a continuation of International Patent Application No. PCT/EP2019/068003, filed on Jul. 4, 2019, which claims priority to German Patent Application No. DE 10 2018 211 166.9, filed on Jul. 6, 2018. The entire disclosure of both applications is hereby incorporated by reference herein.

FIELD

The present invention relates to a method and a device for checking a focus position of an, in particular pulsed, laser beam in relation to a workpiece.

BACKGROUND

When placing welding spots on the workpiece, or generally during welding processing, the laser beam may not be focused correctly on the workpiece for various reasons. In order to avoid this, the respective focus position, i.e. the distance of the beam waist of the laser beam in relation to the workpiece, at a respective position at which a welding spot is intended to be placed, can be checked beforehand manually or by means of pilot light. However, such checking is typically inaccurate and beset by errors. After the welding processing of the workpiece, it is additionally advantageous to check the workpiece again for welding spots or welds that have been placed erroneously (because they have not been placed with the correct focus position).

Electromagnetic radiation, which is generated during the interaction of a laser beam, may be detected with a workpiece in an interaction zone and is emitted from the latter, for example, in order to use the radiation for process control. Laser parameters such as the intensity or the power of the laser, the pulse frequency, etc. can be set on the basis of the detected radiation. Moreover, on the basis of the detected radiation intensity, it is possible to deduce specific events during the processing process, for example the point in time at which the workpiece is pierced by means of the laser beam. The focus position of the laser beam in the beam direction of the laser beam can also be determined in this way.

DE 102 48 458 A1 describes a method for setting a focus position of a laser beam directed at a workpiece. The laser beam emerges from a processing head with a focusing optical unit arranged displaceably therein. In the method, the distance between processing head and workpiece is kept constant. The radiation coming from a region of an interaction zone between laser beam and workpiece is detected and the focusing optical unit is displaced such that a signal corresponding to the detected radiation assumes a maximum value.

SUMMARY

An embodiment of the present invention provides a method that checks a focus position of a laser beam in relation to a workpiece. The method includes: focusing the laser beam at a plurality of positions along a trajectory on the workpiece; detecting radiation generated during an interaction of the laser beam with the workpiece at a respective position of the positions; determining signal values corresponding to the detected radiation at the respective position(s); and checking the focus position at at least one of the positions by comparing the respective signal value, of the signal values, at the respective position with a reference value formed from the signal values.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
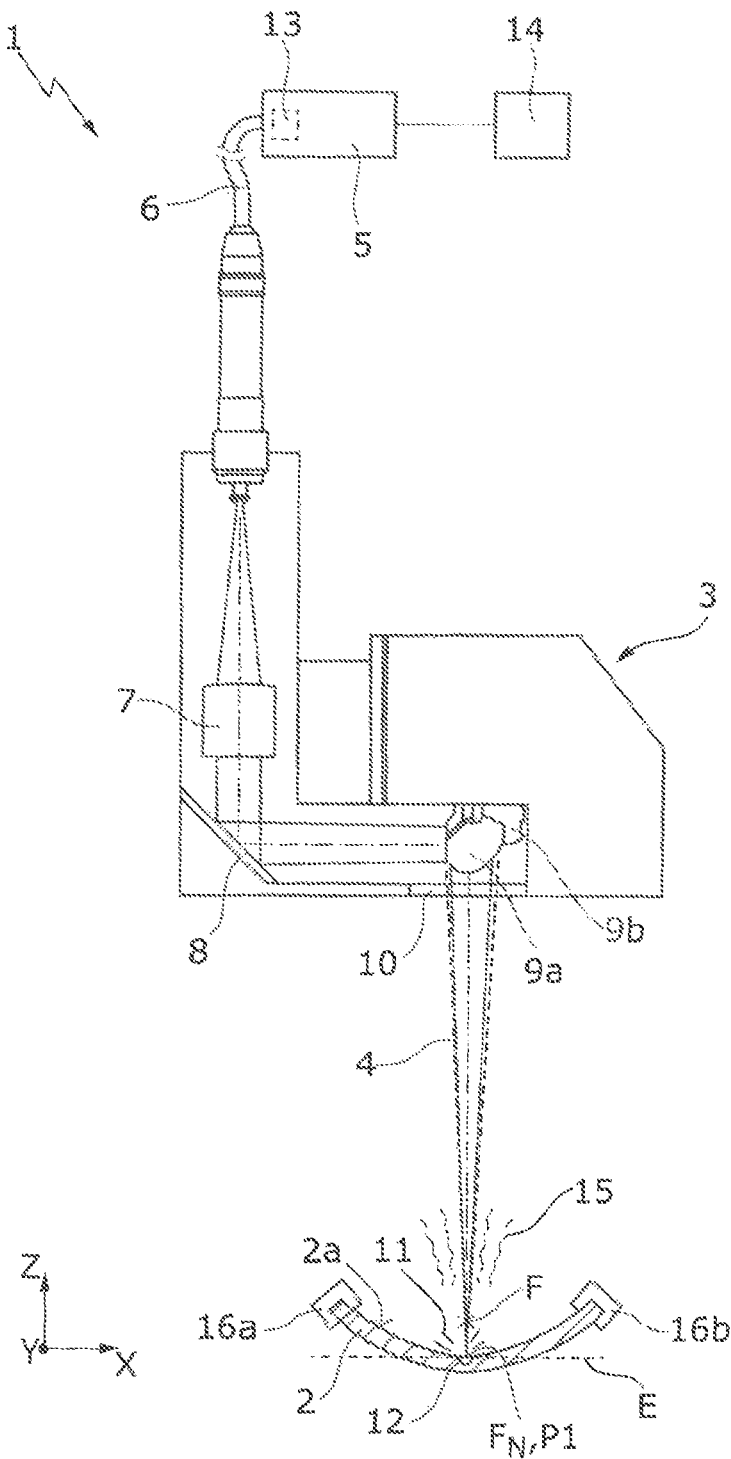
FIG. 1 shows a schematic illustration of a device for the welding processing of a workpiece by means of a laser beam, which device is configured for checking a focus position of the laser beam in relation to the workpiece.

Embodiments of the present invention provide a method and a device for checking a focus position in relation to a workpiece with which the focus position can be checked in a simple manner.

A first aspect of the present disclosure provides a method which includes the following steps: focusing a laser beam at a plurality of positions along at least one trajectory on the workpiece, in particular on the workpiece and on at least one other, structurally identical workpiece, detecting radiation, generated during an interaction of the laser beam, in particular of a respective laser pulse, with the workpiece at the associated position, determining signal values corresponding to the detected radiation at the respective position, and checking the focus position at at least one of the positions by comparing the signal value at the (at least one) position with a reference value formed from the signal values at a plurality of the positions, in particular from the signal values at all of the positions.

The inventors have recognized that the focus position of the laser beam can be checked on the basis of a comparison of a signal value determined at a respective position with a reference value formed from a plurality of signal values available, in particular from all signal values available. It is possible here to exploit the fact that the focus position at the plurality of the positions typically corresponds approximately to the nominal focus position set e.g. with the aid of a focusing optical unit. Particularly during the processing of workpieces that deviate from a planar geometry, i.e. in the case of workpieces whose workpiece surface forms a three-dimensional geometry in space, e.g. in bodywork construction, deviations of the actual focus position from the nominal focus position possibly arise at individual positions, as will be explained below.

Such welding processing, for example, can be carried out with the aid of a programmable or adjustable focusing optical unit. The focusing optical unit or a corresponding control unit here knows the geometry or trajectory to be produced in each case on the workpiece surface and is able to compensate for the guide movement of a robot arm to which the focusing optical unit or a processing head having the focusing optical unit is attached. If a geometry or trajectory to be welded is situated in the space that is reachable by the focusing optical unit, the welding process is initiated. This manner of processing "on-the-fly" presents a major challenge to the setting of the focus position and to the focus position control of the focusing optical unit, such that deviations from the nominal focus position can arise at individual positions during the welding processing. Such deviations can be identified by a signal value determined at the respective position being compared with the reference value.

For forming the reference value, it is possible to use all or optionally a selection of the signal values, which are determined at the (current) workpiece at a plurality of different positions along the trajectory. However, it is also possible, additionally or alternatively, to use, for forming the reference value, signal values that are determined during the welding processing of a plurality of structurally identical workpieces using the same focusing unit or using the same control unit along one and the same trajectory.

This last is advantageous, in particular, if the signal values are determined during the welding processing of the workpiece at a plurality of positions along a trajectory that forms a step seam, wherein welding spots having different seam geometries, e.g. having different seam lengths, or having other different parameters, are produced at the respective positions. In this case, a direct comparison of the signal values at different positions along the trajectory, and thus the formation of a meaningful reference value from the signal values at the plurality of positions, are not readily possible. In order to form the reference value, in this case, the signal values determined at one and the same position along the trajectory at a plurality of workpieces subjected successively to welding processing can be used for forming a reference value for this position. It is also possible to use, for forming the reference value, signal values that are formed at welding spots having an identical seam geometry along at least one trajectory at one and the same workpiece and welding spots having an identical seam geometry, which are formed at different workpieces, in order to form a meaningful reference value for this type of welding spots.

This exploits the fact that a correct focus position is typically set on average, such that deviations from the nominal focus position occur only at individual points or positions. Carrying out a comparison with a reference value that is dependent on the signal values determined at different positions has the advantage over using an absolute or constant reference value that such an absolute reference value is dependent on various influencing factors, such as the material and the power input into the workpiece, the imaging, etc. By using a relative reference value that is dependent on the signal values determined at selected positions or at all positions, it is possible for the checking of the focus position to be kept flexible and independent of technological tables for specific workpiece materials, laser parameters, etc. For carrying out the method, the plurality or the number of positions from which the reference value is formed should be chosen not to be too small. Typically, five or more, in general ten or more, positions should be used in order to form a meaningful reference value that makes it possible to assess the quality of a welding spot at a respective position.

In one variant, the mean value or the most frequent value is determined from the signal values as a reference value. In the case of a typically (three-dimensional) workpiece at the plurality of positions or welding spots, the focus position corresponds to the nominal focus position at the surface of the workpiece, that is to say that "good" welding spots are involved. The mean value is typically the arithmetic mean, that is to say that, in general, the individual signal values are not weighted.

Alternatively, the most frequently occurring signal value can be used as the reference value. In this case, a frequency distribution or a histogram is created for the signal values by the signal values being classified in different classes or value intervals. The most frequent signal value, to put it more precisely, the class or the value interval that contains most of the signal values, is used as reference value in this case.

In an alternative variant, a maximum value of the signal values is used as reference value. As described in DE 102 48 458 A1, cited in the introduction, in the case of an optimum focus position, i.e. in the case of a focus position where the focus or the beam waist of the laser beam is situated on the surface of the workpiece, the radiation detected during the interaction with the workpiece and thus the corresponding signal value are at a maximum. This holds true particularly if the detected radiation is thermal radiation detected by a corresponding radiation detector which is sensitive in the infrared wavelength range.

In a further variant, in a preceding step, a nominal focus position of the laser beam in relation to the workpiece is determined and the focus position is set to the nominal focus position. The nominal focus position can be determined and set, for example, in the manner described in DE 102 48 458 A1, that is to say that the focus position, i.e. the distance of the focus in relation to the workpiece, is changed at a position along the trajectory, for example by the focusing optical unit or a focusing optical element provided therein being displaced. That setting of the focusing optical unit at which the detected radiation or the associated signal value is at a maximum is identified by the nominal focus position. It goes without saying that the nominal focus position can also be determined in some other way.

As has been described further above, the focus position at the plurality of positions should in each case correspond approximately to the nominal focus position. By virtue of the relative comparison of the focus positions at different positions, it is not necessary to determine the focus position in the manner described further above, e.g. by adjusting the focusing optical unit or changing the focus position at each of the plurality of positions, rather it is sufficient to determine and set the nominal focus position at one position.

In a further variant, only the radiation detected during the time duration of a respective laser pulse is used for determining a respective signal value. It has proved to be advantageous to synchronize the time interval in which the radiation is detected and the time interval in which a respective laser pulse of the laser beam is generated. This ensures that signal evaluation is effected only if the pulsed laser beam interacts with the workpiece and emits radiation in the process. In order to generate a signal value from the radiation detected during the duration of an individual laser pulse, digital filtering can be effected, for example, but it is also possible to use a mean value or an integral over the detected radiation as a signal value.

In a further variant, the method comprises: in particular welding processing of the workpiece at least at the plurality of positions along the trajectory, wherein checking the focus position is carried out before the processing, during the processing and/or after the processing of the workpiece. In general, a step seam with a plurality of welding spots is produced along the trajectory since a continuous seam would heat the workpiece to an excessively great extent.

Checking the focus position at the at least one, typically at all, of the plurality of positions can be effected before the (welding) processing of the workpiece. In this case, test welding spots are produced at the plurality of positions and the focus position is checked in the manner described further above. If a deviation from the nominal focus position arises during the checking at individual positions, this deviation can be corrected by the actual focus position at the respective position being adapted to the nominal focus position during the subsequent processing process.

The focus position can also be checked after the end of the welding processing. In this case, the checking of the focus position enables a statement to be made about the quality of the welding carried out in the processing process at the respective positions. For the case where the quality of the welding carried out is rated as inadequate, the workpiece can be reworked. Moreover, on the basis of the rating of the quality of (identical) weldings carried out on a plurality of workpieces, it is possible to define the number of welding positions for future weldings along the trajectory. By way of example, in this case, a respective welding spot can be placed at a larger number of positions along the trajectory than would actually be required for the welding. In this way, a certain number of "not so good" welding spots can be accepted without the quality of the welding as a whole decreasing to an excessively great extent.

Finally, the focus position can also be checked during the (welding) processing. In this case, in general the welding processing (e.g. spot welding) is firstly carried out at a plurality of positions before checking the focus position at the individual positions in the manner described further above, since, for forming a meaningful reference value, in general a signal value is first determined at a minimum number of positions.

In one development, during the welding processing of the workpiece for checking the focus position a signal value at a current position along the trajectory is compared with a reference value formed from the signal values at positions along the trajectory that have previously been subjected to welding processing. In this case, as reference value it is possible to form for example the mean value over all signal values at the positions along the trajectory that have previously been subjected to welding processing. However, it is also possible to use only a predefined number of signal values at positions previously subjected to welding processing for forming the reference value, for example a reference value in the form of a moving average value.

In a further variant, contamination on at least one optical element guiding the laser beam is deduced on the basis of a decrease in the signal values over time during the processing of the workpiece. In this case, typically, the signal values are stored over a longer period of time, i.e. for a plurality of successive processing processes, and a check is made to determine whether the signal values decrease (continuously) over time or over the plurality of (welding) processing processes. The optical element that is contaminated during processing e.g. on account of spatter may be for example a protective glass of the optical unit or of a processing head that serves for guiding the laser beam.

In a further variant, faulty clamping of the workpiece is identified on the basis of a change in the signal values over time. For the typically welding processing, the workpiece part(s) to be welded is/are fixed with the aid of clamping elements or with the aid of a clamping device. The clamping device may be set erroneously during clamping, such that the workpiece is not at the predefined distance or the trajectory to be welded is not in a desired plane. This can be identified on the basis of a deviation of the signal or on the basis of a change in the signal values, for example as a result of an increase in a deviation of a plurality of successive signal values from the reference value. Moreover, the clamping clips (e.g. in the form of C-clips) used for clamping the workpiece may shield the workpiece in the region to be welded. In this case, the respective signal value at the shielded position typically deviates significantly from the reference value.

In one variant, a change in the focus position as a result of metal vapor present in the beam path between a processing head for guiding the laser beam and the workpiece is deduced on the basis of a change in the signal values over time. During welding processing, metal vapor is typically released and is generally carried away by a protective gas flow between the processing head and the workpiece. If the protective gas flow is shielded by the workpiece itself, for example on account of the three-dimensional geometry thereof, or by a clamping or holding unit for the workpiece, this results in a change in the effective focus position of the laser beam on account of the different refractive index of the metal vapor in comparison with air. This can likewise be identified on the basis of a change in the signal values. Typically, when metal vapor is present, the measured signal strength, i.e. the level of the signal values determined, decreases overall during the processing process.

A further aspect of the invention relates to a device of the type mentioned in the introduction comprising: a processing head for focusing the laser beam at a plurality of positions along at least one trajectory on the workpiece, in particular on the workpiece and on at least one other, structurally identical workpiece, a radiation detector for detecting radiation generated during an interaction of the laser beam, in particular of a respective laser pulse, with the workpiece at the respective position, a control unit configured to determine signal values corresponding to the detected radiation at a respective position, and configured to check the focus position at the at least one position by comparing the signal value at the position with a reference value formed from the signal values.

The processing head can be attached to a robot or to a robot arm which enables the processing head to be oriented practically arbitrarily in space in order to traverse a trajectory with a desired geometry on the workpiece and to effect (welding) processing. As has been described further above, a plurality of trajectory(-ies) at the same workpiece or at a plurality of structurally identical workpieces can be traversed before, during or after a processing process with the aid of the processing head. In this case, a plurality of laser pulses can be generated in order to produce a plurality of test welding spots on the workpiece.

The intensity of the radiation generated here can be detected by the radiation detector. The radiation detected by the radiation detector can be a thermal radiation in the infrared wavelength range, that is to say, that a variable that is dependent on the temperature of the workpiece is determined. Depending on the wavelength of the laser beam, radiation detectors that detect radiation in different wavelength ranges than the infrared wavelength range can be used. The radiation detected by two or more different radiation detectors can also be used to determine a signal value at one and the same position.

In one embodiment, the device comprises a laser source for generating the, in particular pulsed, laser beam and the control unit is preferably configured to use only the radiation detected during the time duration of a respective laser pulse for determining a respective signal value. For determining a respective signal value it has proved to be advantageous if the evaluation of the detected radiation is carried out in a manner synchronized with the laser pulses. This ensures that the detected radiation is evaluated only during the time duration of a respective laser pulse, in which an interaction with the workpiece can take place. The laser source can be connected to the processing head via a fiber-optic unit or via a fiber-optic cable, for example. In this case, the radiation sensor can be arranged in the laser source, that is to say, that the radiation propagating from the workpiece into the laser source via the fiber-optic cable is detected. It goes without saying, however, that the radiation sensor can also be arranged elsewhere, for example within the processing head. Moreover, it is not absolutely necessary for the radiation to be detected coaxially, that is to say, that the radiation detector can also be arranged eccentrically with respect to a beam axis of the laser beam. The processing head is not necessarily attached to a robot arm, that is to say, that it is possible to use any other movement unit that enables the processing head to be moved in relation to the workpiece. By way of example, such a movement unit can be a gantry of a laser processing machine on which the processing head is guided movably in at least one spatial direction. It likewise goes without saying that it is not absolutely necessary to use a fiber-optic cable for guiding the laser beam from the laser source to the processing head, rather the laser beam can also be guided to the processing head with free beam propagation.

Further advantages of the invention are evident from the description and the drawings. Likewise, the features mentioned above and those that will be presented below can be used in each case by themselves or as plurality in any desired combinations. The embodiments shown and described should not be understood as an exhaustive enumeration, but rather are of exemplary character for outlining the invention.

In the following description identical reference signs are used for identical or functionally identical component parts.

FIG. 1 shows an exemplary set-up of a device 1 for the welding processing of a workpiece 2, which device has a processing head 3 in order to align a laser beam 4 with the workpiece 2 to be processed, to be welded in the example shown. The laser beam 4 is generated by a laser source 5, which couples the laser beam 4 into the processing head 3 via an optical fiber 6. The laser beam 4 emerges divergently from the optical fiber 6 and enters a focusing optical unit 7 having a focusing lens, and optionally further optical elements in order to focus the laser beam 4 on the workpiece 2, to put it more precisely at a nominal focus position $F_N$. The nominal focus position $F_N$ lies in a workpiece plane E at which the top side of the workpiece 2 is arranged at the position P1 shown in FIG. 1 for the welding processing of the workpiece 2.

The focused laser beam 4 impinges on a deflection mirror 8 and is subsequently deflected at two plane scanner mirrors 9a, 9b in the X-direction and respectively in the Y-direction of an XYZ coordinate system. The X-scanner mirror 9a and the Y-scanner mirror 9b are secured to galvanometers and can be rotated. The position of the axis of rotation of the galvanometers determines the deflection angle of the respective scanner mirror 9a, 9b and thus the position P1, P2, . . . . (cf. FIG. 3) of the laser beam 4 on the workpiece in the image field. The focused laser beam 4 leaves the processing head 3 through an opening that is covered by a protective glass 10 in the form of a plane-parallel plate.

In FIG. 1, the laser beam 4 is oriented in a vertical direction, that is to say that it impinges perpendicularly on the workpiece plane E. In order to determine the focus position F of the laser beam 4 in relation to the workpiece 2 and in order to set the focus position F such that it corresponds to the nominal focus position $F_N$ on the top side 2a of the workpiece 2, the device 1 has a radiation detector 13. The radiation detector 13 can also be fitted elsewhere, for example laterally to the processing head 3. The radiation detector 13 detects radiation 11 that arises during the interaction of the laser beam 4, to put it more precisely during the interaction of laser pulses L1 to L20 (cf. FIG. 2), with the workpiece 2 in an interaction zone 12 in which the workpiece material is melted. In the example shown, the detected radiation 11 is thermal radiation in the IR wavelength range which traverses the beam path of the laser beam 4 and the optical fiber 6 in an opposite direction to the beam direction of the laser beam 4 and is detected by the radiation detector 13 in the laser source 5. For this purpose, the radiation 11 that arises during the interaction with the workpiece 2 can be coupled out from the beam path of the laser beam 4 for example by way of an output coupling element in the form of a dichroic mirror.

For determining the nominal focus position $F_N$, with the aid of the focusing optical unit 7, the focus position F is varied in the direction of propagation of the laser beam 4 (i.e. in the Z-direction) and the radiation 11 generated at the (first) position P1 on the workpiece 2 is recorded. The laser beam 4 is pulsed during the variation of the focus position F and a number of 20 laser pulses L1 to L20 are generated during the variation of the focus position F (cf. FIG. 2). On the basis of the intensity I of the radiation 11 detected for the respective laser pulses L1 to L10, it is possible to establish where the nominal focus position $F_N$ is situated on the workpiece 2. This makes use of the fact that the detected radiation 11 has a maximum of the intensity I at the nominal focus position $F_N$, the maximum being reached at the tenth laser pulse L10 in the example shown.

Figure 2:
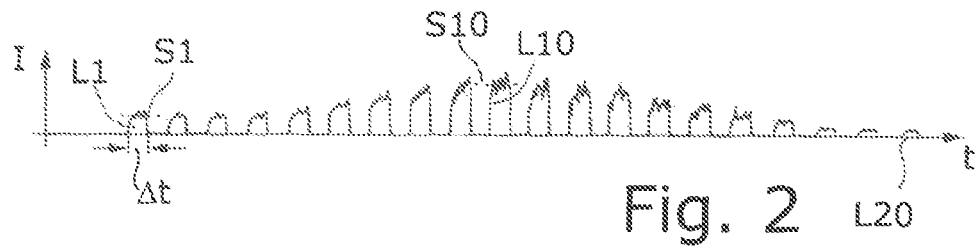
FIG. 2 shows an illustration of the intensity of radiation generated during the interaction of laser pulses of the laser beam for different focus positions at one and the same position on the workpiece.

As can be discerned in FIG. 2, the detected radiation 11 has a noise component. It is therefore not straightforwardly clear which of the laser pulses L1 to L20 has the maximum of the intensity I and can thus be assigned to the nominal focus position $F_N$. A control unit 14 serves to assign a signal value S1 to S20 to a respective laser pulse L1 to L20. If, in the control unit 14, the maximum value of the intensity I of a respective laser pulse L1 to L20 were determined as signal value S1 to S20 and the highest of these signal values S1 to S20 is assigned to the nominal focus position $F_N$, this might involve a noise peak that would corrupt the result.

In order to avoid such a corruption of the result, the radiation 11 detected by the radiation detector 13 is suitably conditioned in the control unit 14 in order to determine a respective signal value S1 to S20. In order to determine a signal value S1 to S20 for a respective laser pulse L1 to L20, (digital) filtering of the intensity I of the detected radiation 11 can be performed in the control unit 14. With or without such filtering, the signal value S1 to S20 can be determined or defined for example in the form of the mean value of the intensity I of a respective laser pulse L1 to L20. The integral of the intensity I of the radiation 11 detected for a respective laser pulse L1 to L20 or some other suitable measure of the intensity I of the respective laser pulse L1 to L20 can also be determined as signal value S1 to S20.

For the evaluation of the detected radiation 11 in the control unit 14 it is advantageous that the control unit 14 also controls the laser source 5 for generating the laser beam 4. In this way, the evaluation of the detected radiation 11 can be effected in a manner synchronized with the generation of the laser pulses L1, ..., L20, that is to say that the detected radiation 11 or the measurement signal is evaluated only during the time duration Δt of a respective laser pulse L1, ..., L20 and not during the interpulse periods. In this way, the evaluation is effected only within time intervals in which the laser beam 4 interacts with the workpiece 2.

Since the focus position F is displaced in the Z-direction at a predefined speed by means of the adjustable focusing optical unit 7, a position in the Z-direction can be uniquely assigned to a respective point in time t. By way of example, the focus position F situated above the workpiece 2 as shown in FIG. 1 corresponds to the fifth laser pulse L5. On the basis of the assignment, the focusing optical unit 7, to put it more precisely a focusing element arranged therein, for example a focusing lens, can be displaced in the beam direction of the laser beam 4 until the nominal focus position $F_N$ is reached on the workpiece 2.

Figure 3:
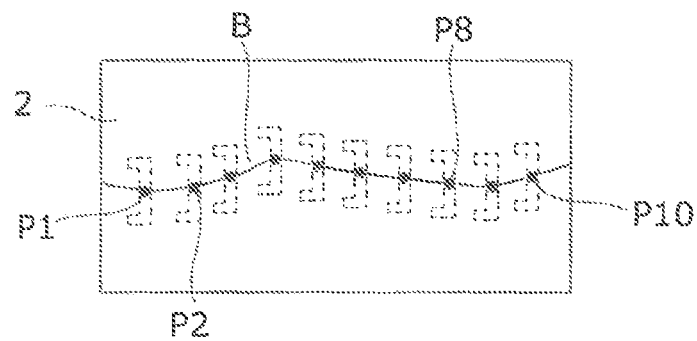
FIG. 3 shows an illustration of a trajectory on the workpiece which is traversed by a processing head and along which at ten different positions a corresponding number of test welding spots are produced by means of laser pulses, FIGS. 4a, b show illustrations of the intensity of the radiation that is detected during the interaction at the ten positions, in an ideal case and in a case where the focus position deviates from a nominal focus position at one of the positions.
Figure 4A:
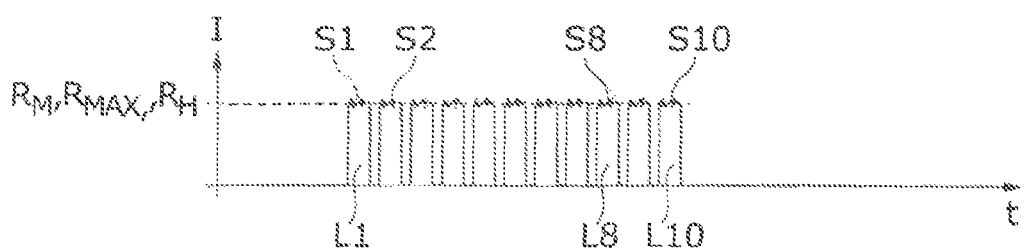

As can be discerned in FIG. 3, the first position P1 corresponds to one of ten positions P1 to P10 which lie along a trajectory B traversed during welding processing of the workpiece 2, to put it more precisely during the welding of two workpiece parts that jointly form the workpiece 2, by means of the processing head 3. In order to check before the processing whether the focus position F during the movement along the trajectory B corresponds to the nominal focus position $F_N$, the trajectory B to be traversed during the welding processing is already traversed before the welding processing and the laser beam 4 is activated at ten positions P1 to P10 along the trajectory B in order to apply ten laser pulses L1 to L10 to the workpiece 2. The intensity of the laser beam 4 is chosen here such that at the ten positions P1 to P10 ten test welding spots are formed on the workpiece 2. The intensity of the radiation 11 detected here is illustrated in FIG. 4a for the case where the focus position F is correct at all ten positions P1 to P10, while FIG. 4b shows the case where the focus position F at the eighth position P8 deviates from the nominal focus position $F_N$.

In order to check the focus position F, in the manner described further above in association with FIG. 2, in the control unit 14 a signal value S1 to S10 is assigned to each of the ten laser pulses L1 to L10. It is assumed for the considerations hereinafter that on average over all positions P1 to P10 the focus position F corresponds to the nominal focus position $F_N$, that is to say that a (significant) deviation from the nominal focus position $F_N$ occurs only at a small number of positions in comparison with the total number of positions P1 to P10. In general, the checking of the focus position F in relation to the workpiece 2 as described below is carried out individually for each of the ten positions P1 to P10. In the example described here, the first position P1 is excluded from the checking since the focus position F at the first position P1 has already been checked or ascertained in the manner described further above. The checking is described below by way of example for the eighth position P8 or for the eighth laser pulse L8.

For checking the focus position F at the eighth position P8, the signal value S8 at the eighth position P8 is not compared with an absolute value, but rather with a reference value $R_M$, $R_{MAX}$ or $R_H$ that forms a relative criterion since the reference value is formed from the signal values S1 to S10 at all ten positions P1 to P10. In the example shown in FIG. 4a, the focus position F at all ten positions P1 to P10 corresponds to the nominal focus position $F_N$. Therefore, the respective signal value S1 to S10 at each of the ten positions P1 to P10 is at a maximum and all ten signal values S1 to S10 are equal in magnitude. The maximum value $R_{MAX}$ of the ten signal values S1 to S10 thus corresponds to the mean value $R_M$ of the ten signal values S1 to S10. Both the mean value $R_M$ of the ten signal values S1 to S10 and the maximum value $R_{MAX}$ of the ten signal values S1 to S10 can be used as reference value. Alternatively, the most frequent value of the ten signal values S1 to S10 can also be used as reference value $R_H$, which corresponds to each of the ten signal values S1 to S10 in the example shown in FIG. 4a.

Figure 4B:
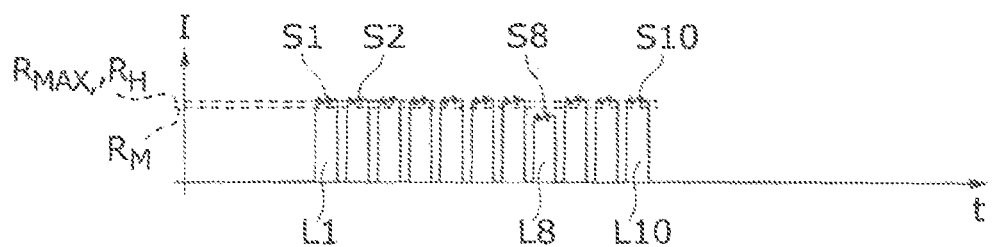

In the example shown in FIG. 4b, the signal value S8 at the eighth position P8 is lower than at the other nine positions P1 to P7, P9, P10, i.e. the focus position F at the eighth position P does not correspond to the nominal focus position F. In order to identify the deviation, the signal value S8 at the eighth position P8 is compared with one of the three reference values $R_{MAX}$, $R_H$, $R_M$ described further above by the control unit 14. In the example shown in FIG. 4b, the maximum value $R_{MAX}$ and the most frequent value $R_H$ correspond to the reference values $R_{MAX}$, $R_H$ shown in FIG. 4a, while the reference value $R_M$ in the form of the mean value is reduced by comparison with the case shown in FIG. 4a.

If, when the signal value S8 is compared with the reference value $R_{MAX}$, $R_H$ or $R_M$, it is determined that the eighth signal value S8 is less than the reference value, for example is less than the mean value $R_M$, in the control unit 14 it is deduced that the focus position F at the corresponding position P8 is not correct. In order to correct the focus position F, before the welding processing is carried out, the focus position F at the eighth position P8, which is set by the programmable or controllable focusing optical unit 7 in the course of the welding processing, can be suitably corrected. If required, it is possible to carry out the variation—carried out in the manner described further above in association with FIG. 2—of the focus position F in the Z-direction at the eighth position P8 in order to determine the nominal focus position $F_N$ at the eighth position P8 for the correction.

On account of the correction of the focus position F at the eighth position P8, it is possible to carry out the welding processing at all positions P1 to P10 with a correct focus position F or with the nominal focus position $F_N$. Optionally, the checking of the focus position F as described further above can be carried out again after the welding processing in order to assess the quality of the weld seam formed during the welding processing, which weld seam can be a step seam or a continuous weld seam. Alternatively, the quality of the weld seam formed during the welding processing can be assessed visually.

The method described further above can also be carried out during a welding process, in particular during a spot welding process, wherein for example C-shaped welding spots are placed at a respective position P1, P2, ..., as is indicated in a dashed manner in FIG. 3. In this case, a respective signal value S1, S2, ... is determined from the radiation detected when a C-shaped welding spot is placed at a respective position P1, P2, .... Here the reference value $R_{MAX}$, $R_M$, $R_H$ at a current position, e.g. P8, is determined from those positions P1, P2, ..., P7 which have already been processed by means of the laser beam 4. This is advantageous particularly if the focus position F at the first position P1 was set beforehand such that it corresponds to the nominal focus position $F_N$. It is not absolutely necessary for all positions P1, P2, . . . that have already been processed by means of the laser beam 4 to be used for forming the reference value $R_{MAX}$, $R_M$, $R_H$; rather, only a predefined number of positions, e.g. P4, . . . , P7, that directly precede the current position P8 can be used for forming the mean value. In this way, it is possible to form a reference value $R_M$ in the form of a moving average value, for example.

For the case where the plurality of welding spots P1, P2, . . . , P8—unlike what is indicated in a dashed manner in FIG. 3—have a different geometry such that they have different lengths or are welded with different parameters, a direct comparison of the signal values S1, S2, . . . , S10 at different positions P1, P2, . . . , P10 along the trajectory B or the formation of a reference value $R_{MAX}$, $R_M$, $R_H$ from the signal values S1, S2, . . . , S8 at the plurality of the positions P1, P2, . . . , P10 along the trajectory B is not readily possible.

In this case, alternatively, the reference value $R_{MAX}$, $R_M$, $R_H$ can be determined from a plurality of signal values S8, S8', . . . that are determined during a plurality of welding processes at a plurality of different, but structurally identical workpieces 2. The plurality of signal values S8, S8', . . . here can be determined in each case at one and the same position P8 along a trajectory B, which is identical for all of the structurally identical workpieces 2 subjected to welding processing.

In this case, for forming the reference value $R_{MAX}$, $R_M$, $R_H$, the welding processes at the different workpieces 2 are proceed under, as far as possible, identical conditions. In particular, the clamping of the respective workpiece 2 with the aid of the clamping clips 16a, b should always be effected in the same way. In order to determine the reference value $R_{MAX}$, $R_M$, $R_H$ it is likewise possible in this case for a plurality of signal values S1, S2, . . . at welding spots P1, P2, . . . that were welded on one and the same workpiece 2 with comparable welding parameters additionally to be used for forming a meaningful reference value $R_{MAX}$, $R_M$, $R_H$ for this type of welding geometry.

On the basis of the signal values S1 to S10 determined at the respective positions P1 to P10, besides the focus position F it is also possible to determine other variables that enable a statement to be made about the welding process and/or about optical units used when carrying out the welding process, etc. By way of example, increasing contamination on at least one optical element guiding the laser beam 4, generally at the protective glass 10, can be deduced on the basis of a decrease in the signal values S1, S2, . . . , S10 over time during the processing of the workpiece 2. In this case, the decrease in the signal values S1, S2, . . . S10 over time is typically not observed during a single welding process, but rather during a plurality of welding processes, i.e. over a relatively long period of time. If the absolute value of the intensity I of the detected radiation 11 or of the signal values S1, S2, . . . determined falls below a threshold value, the protective glass 10 can be cleaned or optionally exchanged. It is optionally also possible to identify the contamination of the protective glass during a single processing process.

Faulty clamping of the workpiece 2 can also be deduced on the basis of a change in the signal values S1, S2, . . . , S10 over time. Such faulty clamping of the workpiece 2 can have the effect, for example, that the workpiece or its surface 2a at the first position P1 shown in FIG. 1 is not arranged in the workpiece plane E, but rather is at a distance therefrom in the Z-direction. This case involves determining and assessing the deviation of the signal values S1, S2, . . . from the reference value $R_{MAX}$, $R_M$, $R_H$ at a plurality of successive positions P1, P2. On the basis of the assessment it is possible to establish whether the entire workpiece 2 has been inserted obliquely. In contrast thereto, in the case of faulty (spot) welding, in general only a single signal value S1, S2, . . . deviates significantly from the reference value $R_{MAX}$, $R_M$, $R_H$. During the welding processing, the case may possibly also occur that clamping clips 16a, b—illustrated in FIG. 1—that are used for clamping or for holding the workpiece 2 are situated undesirably at one of the positions P1 to P10 at which the workpiece 2 or the two workpiece parts is/are welded together, that is to say that the clamping clips 16a, b shield the workpiece 2. Since the clamping clips 16a,b typically consist of a different material than the workpiece 2, a typically considerable deviation of the signal value S1, S2, . . . from the reference value $R_{MAX}$, $R_M$, $R_H$ occurs at the corresponding position P1, P2, . . . . The deviation is in general significantly greater than the deviation of the signal value S1, S2, . . . that occurs in the case of the deviation of the focus position F from the nominal focus position $F_N$. Faulty clamping of the workpiece 2 can therefore be deduced on the basis of the magnitude of the deviation or the difference between the signal value S1, S2, . . . and the reference value $R_{MAX}$, $R_M$, $R_H$.

A change in the focus position F as a result of metal vapor 15 (cf. FIG. 1) present in the beam path of the laser beam 4 between the processing head 3 and the workpiece 2 can also be deduced on the basis of a change in the signal values S1, S2, . . . over time. The metal vapor 15 is typically removed from the beam path of the laser beam 4 with the aid of an auxiliary or protective gas flow (with the aid of a suitable gas nozzle). If the gas flow is shielded, by the workpiece 2, by the clamping clips 16a,b or by other components used for the mounting of the workpiece 2, the metal vapor 15 passes into the beam path of the laser beam 4 and leads to a change in the focus position F on account of the changed refractive index. Typically, when metal vapor 15 is present, the measured signal strength, i.e. the intensity I of the signal values S1, S2, . . . determined, decreases overall, such that the presence of the metal vapor 15 can be deduced on the basis of the reduced level, which typically occurs only during an individual processing process.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for checking a focus position of a laser beam in relation to a workpiece for welding processing of the workpiece, the method comprising:
   focusing and directing the laser beam at a plurality of positions along a trajectory on the workpiece,
   detecting radiation generated during an interaction of the laser beam with the workpiece at a respective position of the plurality of positions,
   determining a plurality of signal values, each respective signal value corresponding to the detected radiation at the respective position of the plurality of positions,
   checking the focus position at at least a first position of the plurality of positions by comparing the signal value at the first position with a reference value, wherein the reference value is formed from the signal values at the plurality of positions along the trajectory on the workpiece, and
   based on the comparing, either adapting the focus position at the first position to a nominal focus position or reworking the workpiece.

2. The method as claimed in claim 1, wherein the reference value is a mean value or a most frequent value of the signal values.

3. The method as claimed in claim 1, wherein a maximum value of the signal values is used as the reference value.

4. The method as claimed in claim 1, wherein, in a preceding step, the nominal focus position of the laser beam in relation to the workpiece is determined.

5. The method as claimed in claim 1, wherein only the radiation detected during a time duration of a respective laser pulse of the laser beam is used for determining a respective signal value of the signal values.

6. The method as claimed in claim 1, wherein the checking the focus position is carried out before the welding processing, during the welding processing, or after the welding processing of the workpiece.

7. The method as claimed in claim 6, wherein for checking the focus position during the welding processing of the workpiece, a signal value, of the signal values, at a current position, of the positions, along the trajectory is compared with the reference value formed from the signal values at the respective positions along the trajectory that have previously been subjected to the welding processing.

8. The method as claimed in claim 1, the method further comprising deducing an increasing contamination on at least one optical element guiding the laser beam on a basis of a decrease in the signal values over time during processing of the workpiece.

9. The method as claimed in claim 1, the method further comprising deducing a faulty clamping of the workpiece on a basis of a change in the signal values over time.

10. The method as claimed in claim 1, the method further comprising deducing a change in the focus position as a result of metal vapor present in a beam path of the laser beam between a processing head and the workpiece on a basis of a change in the signal values over time.

11. The method as claimed in claim 1, wherein the laser beam is a pulsed laser beam, and wherein the detecting the radiation generated during the reaction of the laser beam comprises detecting the radiation generated during the reaction of a respective laser pulse of the pulsed laser beam.

12. The method as claimed in claim 1, wherein the focusing of the laser beam comprises focusing the laser beam at the plurality of positions along the trajectory on the workpiece and on at least one other, structurally identical workpiece.

13. A device for checking a focus position of a laser beam in relation to a workpiece for welding processing the workpiece, the device comprising:
   a processing head configured to focus and direct the laser beam at a plurality of positions along at least one trajectory on of the workpiece,
   a radiation detector configured to detect radiation generated during an interaction of the laser beam with the workpiece at a respective position of the plurality of positions,
   a control unit configured to:
      determine a plurality of signal values, each respective signal value corresponding to the detected radiation at the respective position of the plurality of positions,
      check the focus position at the at least a first position of the plurality of positions by comparing the signal value at the first position with a reference value, wherein the reference value is formed from the signal values at the plurality of positions along the trajectory on the workpiece, and
      based on the comparing, adapt the focus position at the first position to a nominal focus position or rework the workpiece.

14. The device as claimed in claim 13, further comprising: a laser source for generating the laser beam at the respective positions,
   wherein the control unit is configured to use only the radiation detected during a time duration of a respective laser pulse of the laser beam for determining the respective signal value.

* * * * *